(12) United States Patent
Garcin et al.

(10) Patent No.: US 8,493,967 B2
(45) Date of Patent: Jul. 23, 2013

(54) METHOD AND MANAGEMENT OF PUBLIC IDENTITIES IN AN INFORMATION TRANSMISSION NETWORK, SERVER FOR MANAGING PUBLIC IDENTITY RECORDS, EQUIPMENT FOR MANAGING A GROUP PUBLIC IDENTITY AND CORRESPONDING COMPUTER PROGRAMS

(75) Inventors: Sébastien Garcin, Marseille (FR);
Sébastien Prouvost, Toulouse (FR);
Olivier Cleuziou, Ivry sur Seine (FR)

(73) Assignee: France Telecom, Paris (FR)

( * ) Notice: Subject to any disclaimer, the term of this patent is extended or adjusted under 35 U.S.C. 154(b) by 909 days.

(21) Appl. No.: 12/307,742

(22) PCT Filed: Jul. 6, 2007

(86) PCT No.: PCT/FR2007/051611
§ 371 (c)(1),
(2), (4) Date: Jan. 6, 2009

(87) PCT Pub. No.: WO2008/003915
PCT Pub. Date: Jan. 10, 2008

(65) Prior Publication Data
US 2009/0296690 A1    Dec. 3, 2009

(30) Foreign Application Priority Data

Jul. 6, 2006    (FR) .................................... 06 52828

(51) Int. Cl.
*H04L 12/66* (2006.01)
(52) U.S. Cl.
CPC ..................................... *H04L 12/66* (2013.01)
USPC ........................................................ 370/352

(58) Field of Classification Search
USPC ...... 370/259–271, 352, 493–495; 379/201.01, 379/201.07–201.08, 202.01–207.03, 212.01
See application file for complete search history.

(56) References Cited

U.S. PATENT DOCUMENTS

| | | | | |
|---|---|---|---|---|
| 5,619,555 | A | * | 4/1997 | Fenton et al. ............. 379/88.11 |
| 5,920,622 | A | * | 7/1999 | Erb et al. ...................... 370/261 |
| 6,163,692 | A | * | 12/2000 | Chakrabarti et al. ......... 370/261 |

(Continued)

OTHER PUBLICATIONS

"Call Signalling Protocols and Media Stream Packetization for Packet-based Multimedia Communication Systems", ITU-T Standard Pre-Published (P), Int'l Telecommunications Union, Geneva, CH, No. H2250 (May 2006), XP017404721, pp. 54, 70, and 71.

*Primary Examiner* — Ricky Ngo
*Assistant Examiner* — Phuongchau B Nguyen
(74) *Attorney, Agent, or Firm* — Knobbe Martens Olson & Bear LLP

(57) ABSTRACT

This method of managing public identities in an information transmission network (11) of internet type implementing an SIP protocol for establishing data transmission links between said network and equipment for managing a group public identity (10) connected to this network is characterized in that it comprises: —a prior step of recording a group common public identity representative of at least one group of several individual public identities managed by said management equipment (10), at a public identities record management server (12); —a step of verifying a request to establish an incoming call, said request containing a numbering sequence, intended to verify whether said sequence corresponds to a recorded group public identity; and a step of sending said request to a contact address corresponding to the recorded group public identity.

9 Claims, 2 Drawing Sheets

U.S. PATENT DOCUMENTS

| | | | |
|---|---|---|---|
| 6,411,605 B1 * | 6/2002 | Vance et al. | 370/261 |
| 6,484,196 B1 * | 11/2002 | Maurille | 709/206 |
| 6,594,693 B1 * | 7/2003 | Borwankar | 709/219 |
| 6,657,992 B1 | 12/2003 | Christie, IV | |
| 6,775,264 B1 * | 8/2004 | Kurganov | 370/352 |
| 7,729,700 B2 * | 6/2010 | Alemany et al. | 455/436 |
| 2002/0004900 A1 * | 1/2002 | Patel | 713/155 |
| 2004/0133683 A1 | 7/2004 | Keller et al. | |
| 2006/0019655 A1 * | 1/2006 | Peacock | 455/426.1 |
| 2006/0285671 A1 * | 12/2006 | Tiruthani et al. | 379/202.01 |
| 2007/0091878 A1 * | 4/2007 | Croak et al. | 370/356 |
| 2010/0002686 A1 * | 1/2010 | Rosenberg et al. | 370/352 |

* cited by examiner

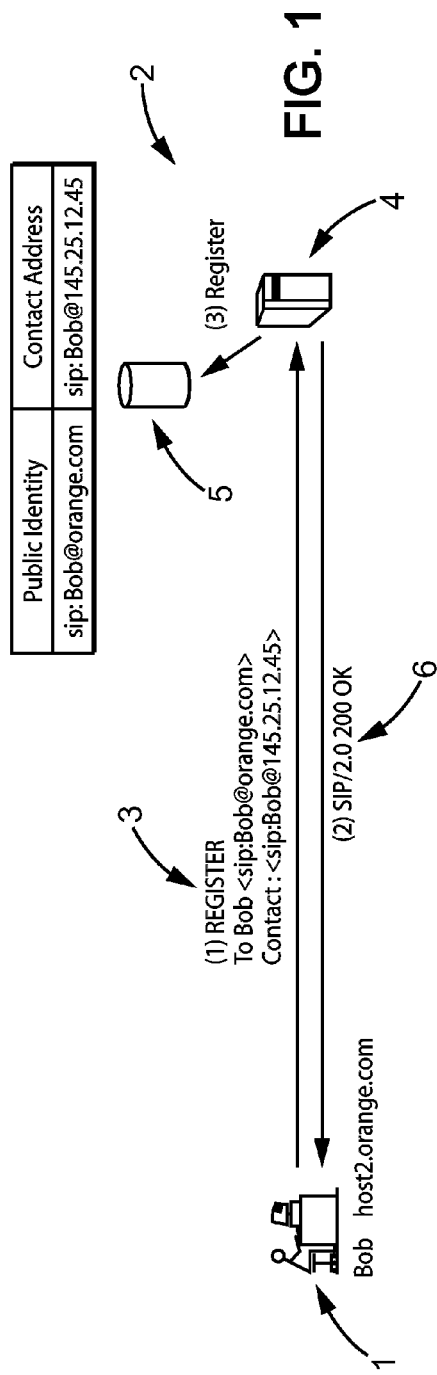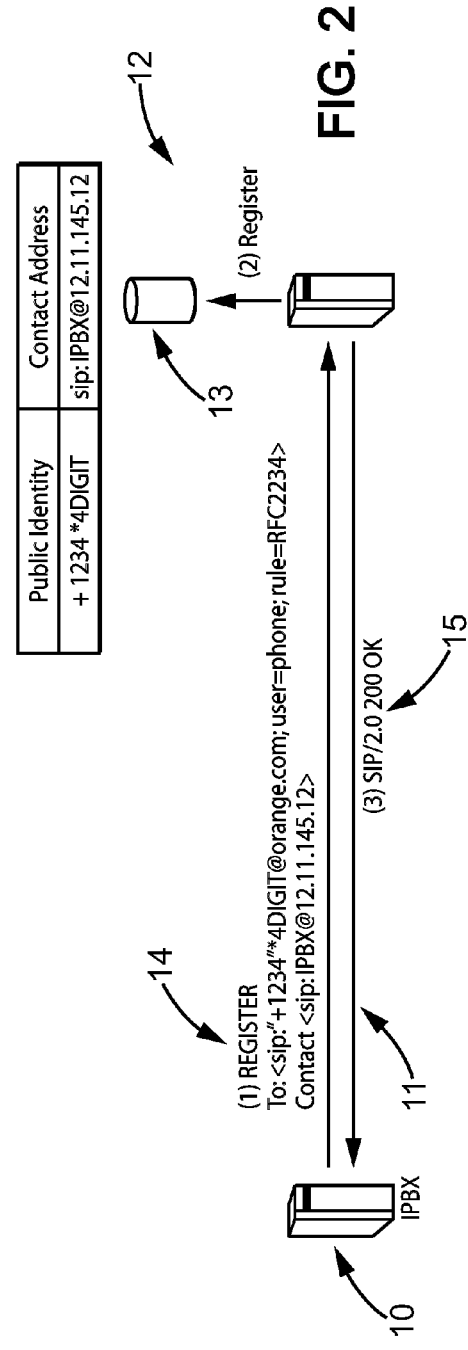

METHOD AND MANAGEMENT OF PUBLIC IDENTITIES IN AN INFORMATION TRANSMISSION NETWORK, SERVER FOR MANAGING PUBLIC IDENTITY RECORDS, EQUIPMENT FOR MANAGING A GROUP PUBLIC IDENTITY AND CORRESPONDING COMPUTER PROGRAMS

This application is a 35 U.S.C. §371 National Stage entry of International Patent Application No. PCT/FR2007/051611, filed on Jul. 6, 2007, and claims priority to French Application No. FR 0652828, filed on Jul. 6, 2006, both of which are hereby incorporated by reference in their entireties.

FIELD OF INVENTION

The present invention relates to a method for managing public identities in a data transmission network It also relates to a corresponding server for managing public identity records, an item of equipment for managing a group public identity and computer programs for this application.

More particularly, the invention relates to internet-type data transmission networks using a session initiation protocol (SIP) to initiate data transmission links between the network and a group public management item of equipment connected to such a network.

BACKGROUND OF THE INVENTION

The SIP protocol has become the protocol of reference for initiating voice communications sessions between several users in an internet protocol (IP) environment. Its aim, optionally within the framework of global network architectures such as those defined by particular standards for allowing a telecommunications operator to offer its clients voice services over an IP network (for example architectures defined by ETSI TISPAN or CableLabs), is to allow uses currently known in commutated telephone networks (CTN) to be reproduced and extended. Users of a SIP network are identified either by a fixed-length telephone number, such as for example ten digits in France, referred to as a closed plan, or variable length such as for example according to geographical area in Germany, referred to as an open plan, or by a dedicated alphanumeric identifier close to the SIP mail format: URI (Uniform Resource Identifier).

The SIP protocol also enables connection to networks of telecommunications operators having different types of users and different types of terminal equipment. Among these, the case of company networks or IP private branch exchange (IPBX) can be mentioned, i.e. private company networks connected over IP to the network of a public operator and capable of offering services to terminals connected on the company network (such as for example speed dialling, etc.) as is currently the case with private automatic branch exchanges (PABX) in companies.

In telephone networks, these entities are generally constituted by one or more number ranges of the numbering plan of the country where they are connected (for example, the range 123456 of the French numbering plan), these ranges themselves capable of being fixed-length, as is the case in France, or variable-length as is the case in other countries.

In the latter case, it is the manager of the company network or IPBX which is responsible for organizing its range(s) into sub-ranges having optionally different lengths.

The network is then transparent to this organization and confines itself to delivering any call directed to one of the numbers of one of its ranges to this company network or IPBX, regardless of the length of this number and whether or not it complies with the number length of the sub-range to which it belongs.

The SIP protocol is based on a concept of double identification of users:
- a first identifier, which will hereinafter be called public identity (known as Address of Record), representing the identity on the basis of which the user can be contacted (for example the telephone number or an alphanumeric sequence of the type forename.surname@domain),
- a second identifier, which will hereinafter be called the address of contact (known as Contact Address), representing the physical network address where the user can be contacted (for example the IP address of the user terminal).

The association between a public identity and one (or more) contact address(es) can change over time. A phase called the registration phase allows a user to inform the network and more particularly a specific entity of the latter, which manages his registration status (called the "REGISTRAR"), of the association between his public identity and his contact address(es).

This association is then stored in a location database of a location server associated with the network which will be queried during an incoming request directed to the user (identified by his public identity) in order to find the associated contact address(es) to which this request is to be forwarded.

The implementation of this registration mechanism by the SIP protocol is as follows:

A user agent ("UA") registers on the network by sending a "REGISTER" message to its "REGISTRAR". The "To" header of this "REGISTER" message contains the public identity to be registered and the "Contact" header contains its contact address, i.e. the physical address of the corresponding equipment (for example its IP address). On receipt of this "REGISTER" message, the "REGISTRAR" records this information in the location database then responds by an acceptance message ("200 OK"). This message terminates the SIP registration phase.

During a single SIP registration ("REGISTER"—"200 OK"), it is possible to register several contact addresses associated with the same public identity. On the other hand it is not possible to register explicitly, via the SIP signalling, several public entities associated with the same contact address.

Registering several public entities therefore supposes initiating at least as many registrations as the number of public identities to be registered.

In the case for example of an IPBX connected to a public network by means of the SIP protocol and serving several users each allocated a separate public entity, this IPBX must therefore send the same number of REGISTER" messages as the number of public identities required to be accessible from the public network.

The IP multimedia subsystem (IMS) architecture defined by 3GPP and ETSI TISPAN improves this mechanism by allowing the registration, under certain conditions, of several public identities at a single contact address by means of a single SIP registration phase. In fact, this architecture is supported by a user database (called HSS: home subscriber server) in which is stored the set of public identities to which each user subscribes. Now, among a user's public identities, one or more identity sets registered by default can be defined, i.e. one or more identity sets which will automatically be registered by the SIP network when one of the identities of the set is explicitly registered by the user during a SIP registration. The default registration of this identity set associated with the identity during registration is therefore at the initiative of the network, the subscriber being unable to act other than by modifying his subscription offer with his operator.

The characteristic common to the registration mechanism as well as to its enhancement as defined within the IMS architecture framework is the individual and exhaustive storage of the public identities registered in the location database.

Following the base mechanisms defined in the SIP protocol, a "UA" desiring to register several public identities simultaneously must currently initiate as many registrations as the number of entities to be registered. This has the drawback of leading to a heavy network load in terms of messages exchanged and associated processing, and consequently may give rise to instances of congestion.

The registration moreover generally takes place at initialization (or reinitialization) of a "UA" and must periodically be refreshed. However, as such reinitialization can occur after a network problem, sending a significant number of messages following a network problem can then itself aggravate this network problem.

Finally, this results in a registration delay for all users, which can be also problematic given that an unregistered user can neither receive nor transmit calls.

The mechanism supported by the IMS architecture for defining default-registered identities overcomes these drawbacks, since a single "REGISTER" message is sufficient to register several public identities. On the other hand, it requires prior declaration in the network of each of the identities which are to be the subject of a group registration, as well as the storage of these identities in the location database.

This is not at all suited for example to an IPBX or a company network allocated open telephone number ranges, as this requires the internal organization of the number range to be made visible by the public network and furthermore requires a needlessly large storage volume of the individual numbers of the range.

This moreover involves a complex process for synchronizing the public network data with the modifications (addition, deletion of numbers, etc.) that can be made at any time by the company network or IPBX manager to the organization of its number range(s).

The same drawbacks are observed when the company network users are in sip form: URI (ex. sip: terminal X@YYYYYY.com with X varying from 0 to 100). It is noted that such a company desiring to increase the number of its terminals must contact its connecting operator in order to modify its default registration parameters.

The commuted telephone network (CTN) allows the numbering to be transmitted as the number is dialled by the subscriber in the form of a succession of messages each containing a partial sequence of the number dialled. This "overlap" mechanism is often used when the number dialled belongs to an open plan (i.e. to a range of variable length). In the framework of an IMS-type architecture, an incoming call request carrying a partial number sequence is rejected by the network in the same way as if this sequence corresponded to a non-allocated (i.e. unregistered) number. This is linked to the fact that only a complete number can be registered on a SIP network and requires the presence of an intermediate network upstream of the SIP network which detects an overlap numbering and reconstitutes the numbering from the partial sequences received before submitting the message to the SIP network.

SUMMARY OF THE INVENTION

The aim of the invention is therefore to resolve these problems.

To this end, the subject of the invention is a method of initiating data transmission links between a network and group public management equipment connected to this network, characterized in that it comprises:

a preliminary step of defining and registering said group public identity representing at least one group of several individual public entities managed by said group public management equipment;

a step of verifying a request to initiate an incoming call, said request containing a numbering sequence intended to verify if said sequence corresponds to a registered group public identity;

a step of sending said request to a contact address corresponding to the registered group public identity.

This method can also have one or more of the following features:— the step of defining the group public identity consists of defining a rule for associating said several individual public entities in a group and the verification step consists of verifying if said numbering sequence complies with the defined association rule;

the step of registering the common group public identity consists of registering this group public identity in a location database of said network;

said group public identity is associated with data identifying the latter as a group common identity in the location database;

the group common public identity is formed by a common part of the various individual public entities of the group.

According to another aspect, said contact address corresponding to that of said group public entity management equipment, said method comprises, following the receipt of said request to initiate an incoming call by said equipment:

a step of analysis by said equipment of this group public identity in order to extract the corresponding individual public identity;

a step of routing said request to an addressee corresponding to the individual public identity extracted and connected to this equipment, if said numbering sequence is complete; and a step of sending a message to said network indicating that the number is incomplete, if said numbering sequence is partial.

Thus, the request is routed by the network to the equipment responsible for managing the group common public identity and the latter implements a step of complete analysis of this identity in order to extract from it the corresponding individual public identity and route this data to a corresponding addressee connected to this equipment. If the number is incomplete, an error message indicating that the number is incomplete is transmitted over the network, in order to invite the caller terminal to transmit the number completed by the additional digits which would have been dialed in the meantime by the caller.

The invention also relates to an item of equipment for managing a group public identity in an internet-type information transmission network using a SIP protocol to initiate data transmission links between said item of equipment and said network, characterized in that it comprises:

means for sending a request for registration of a group common public identity representing at least one group of several individual public entities in a location database linked to a server for managing public identity records associated with the network;

means for analysis of a request to initiate an incoming call, said request containing a group public identity registered in said location database, for extracting the corresponding individual public identity;

and in that it is suitable for implementing:

means for routing said request to an addressee corresponding to the individual public identity extracted and connected to said group public identity management server, if said request numbering sequence is complete; and means for sending a message to said network indicating that the number is incomplete, if said numbering sequence is partial.

According to yet another aspect, a subject of the invention is a server for managing public identity records for an internet-type information transmission network using a SIP protocol to initiate data transmission links between said network and a group public identity management item of equipment connected to this network, said server being linked to a registration location database, characterized in that it comprises:

means for defining and registering a group common public identity representing at least one group of several individual public entities managed by said management item of equipment;

means for verifying a request to initiate an incoming call, said request containing a numbering sequence, suitable for verifying if said sequence corresponds to a group public identity registered in the location database; and means for sending said request to a contact address corresponding to the registered group public identity.

According to another aspect, a subject of the invention is a computer program product downloadable from a communications network and/or stored on a support which can be read by a computer and/or executed by a microprocessor of a registration management server, characterized in that it comprises program code instructions for implementation of the method according to the invention.

Finally, the invention relates to a computer program product downloadable from a communications network and/or stored on a support which can be read by a computer and/or executed by a microprocessor of a group public identity management item of equipment, characterized in that it comprises program code instructions for implementation of the method according to the invention.

Thus the invention makes it possible to overcome the drawbacks of each of the two methods of the state of the art by making it possible, by means of a unique "REGISTER" message, to register a set of public identities (potentially very large) in the form of a "rule" defining a group, without the network having to individually store each of the identities constituting this set.

Registration of the group rule makes it possible for the user (for example a company network) to take responsibility for call termination without the need to individually declare each of the associated public identities. Modification of an existing rule is carried out dynamically via the signalling.

The invention moreover makes it possible for a SIP network to route a request to initiate an incoming call containing a partial numbering sequence but complying with one of the rules stored in the SIP network. The advantage is that the entity receiving the request to initiate a call containing an incomplete number is the entity which manages these numbers. This entity can then send an error message to the caller indicating that the number is incomplete (a "484 address incomplete" message) thus issuing an invitation to transmit the number completed by the additional digits which would have been dialled in the meantime by the caller. Without the method defined by this invention, the caller receives an indication that the number is not allocated, which ends the call.

The method according to the invention then allows the registration on a SIP network in the form of a group definition rule of an indeterminate set of identities which are not known individually by the network. Examples of immediate application are registration on an operator network of a company network for example or an IPBX to which is allocated one or more variable-length telephone number ranges as well as the handling of incoming requests on a SIP network containing an incomplete numbering sequence.

BRIEF DESCRIPTION OF THE DRAWINGS

The invention will be better understood on reading the following description, given by way of example only with reference to the attached drawings, in which:

FIG. 1 represents a block diagram illustrating the structure and functions of a method and system for SIP registration of a SIP:URI type individual identity of the state of the art;

FIG. 2 represents a block diagram illustrating the functional structure of a method and system for registering a group definition rule implemented according to the invention.

DESCRIPTION OF THE PREFERRED EMBODIMENTS

Figure 3:
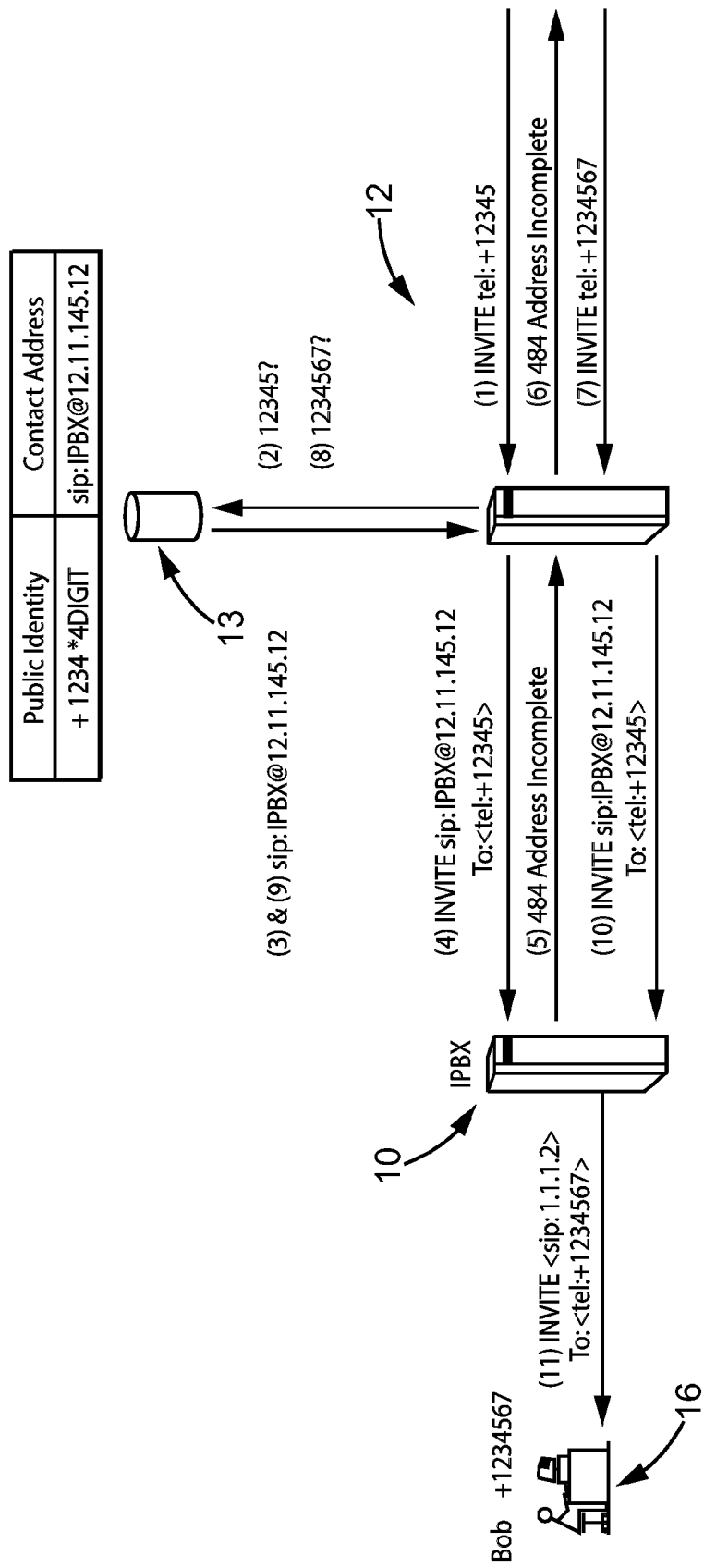
FIG. 3 represents a block diagram illustrating call routing in a situation of incomplete numbering in a system according to the invention.

As mentioned previously, the invention relates to a method for managing public identities in an internet-type information transmission network using a SIP protocol for initiating data transmission links between said network and a group identity management item of equipment connected to this network.

The implementation by the SIP protocol of a registration mechanism as currently known in the state of the art is illustrated in FIG. 1.

According to this registration mechanism, a "UA" designated by the general reference 1 on this figure, registers with the network denoted by the general reference 2, by sending a "REGISTER" message denoted by the general reference 3 to its "REGISTRAR" denoted by the general reference 4, which is in fact associated with a location server which is itself connected to a location database denoted by the general reference 5.

The header marked "To" of this "REGISTER" message 3 contains the public identity to be registered and the "Contact" header, its contact address, i.e. the physical address of the corresponding item of equipment such as for example its IP address. On receipt of this "REGISTER" message, the "REGISTRAR" checks this information in the location database 5 then replies with an acceptance message denoted by the general reference 6 ("200 OK") this message ending the SIP registration phase.

As previously mentioned, during a single SIP registration ("REGISTER"—"200 OK"), it is possible to register several contact addresses associated with the same public identity. On the other hand it is not possible to register explicitly, via the SIP signalling, several public entities associated with the same contact address.

Registering several public entities therefore supposes a priori initiating at least as many registrations as there are public identities to be registered.

The invention makes it possible to resolve these problems.

Thus while the SIP protocol only allows a "UA" to transmit an individual public identity in its registration request (this identity being capable of being used to infer a set of linked identities to be registered at the same time), in the method and system according to the invention it is provided that the "UA" includes a group definition rule or a pointer to a previously-configured rule on the network, in its registration request in order to register an indeterminate set of identities complying with this rule and therefore forming part of a group of several individual public identities. Thus for example different rules can be envisaged, such as for example "all numbers starting with 12345" or "all 7- to 10-digit numbers starting with 12345" or also "all identities containing the sequence of characters qwerty".

Then, during receipt of an incoming call request, in addition to the current mechanism making it possible to ascertain if the public identity involved is present in the location database, in order to retrieve the contact address(es) to which the request must be forwarded, checking (i.e. for example the location server) if this identity complies with one of the previously registered rules. The request is then transmitted to the contact address(es) associated with each of the rules that it complies with.

An embodiment for registering a rule of the type "all the sip: URI of which the user part starts with the characters xyz" can be:

reusing the "REGISTER" message to carry a rule registration request, reusing the "To" header to carry the rule to be registered, or the pointer to this rule, using after the characters xyz a "wild card" character such as <*> to indicate that this can be an indefinite number of characters having any value whatsoever, defining a new sip: URI parameter (for example a "rule") to indicate that it is a sip: URI of which the user part comprises a rule and that the character <*> must be interpreted as a "wild card", storing this rule in the same location database as the one used for the individual public identities.

Such a registration request then has the following form:
REGISTER . . . .
To: sip: xyz<*>@domain; rule.

In order to allow more complex rules, it is possible to consider the set of rule-representation symbols defined in the augmented Backus-Naur form (ABNF) syntax, this syntax being the one used to represent the SIP protocol.

Another enhancement can be that the parameter or any other information indicating that the registration request comprises a rule, also indicates the syntax used to represent this rule.

FIG. 2 shows a flowchart representing the complete registration of an example of a rule defined as follows "all telephone numbers starting with +1234 followed by four more digits (comprised between 0 and 9)". This rule can be described as follows according to the ABNF syntax: "+1234" <*>4DIGIT. This rule can therefore be registered by a "REGISTER" message containing the "To" field, this rule being described in the ABNF syntax. The syntax used to represent the rule is denoted in the new parameter "rule=RFC2234".

Thus:
REGISTER . . . .
To: sip::"+1234"*4DIGIT@orange.com; user=phone; rule=RFC2 234.

In this FIG. 2 a group public management item of equipment can be seen, denoted by the general reference 10 in this figure and for example constituted by an IPBX.

This IPBX is connected for example through an internet-type information transmission network 11 to a location server denoted by the general reference 12, associated with a location database denoted by the general reference 13.

The registration message "REGISTER" is denoted by the general reference 14, the acceptance message ("200 OK") being denoted by the general reference 15.

Thus in the management method according to the invention, a step is implemented for defining and registering a group public identity representing at least one group of several individual public entities managed by a group public management item of equipment connected to the network, such as for example the terminal 10.

The definition of the group common public identity is in fact a definition of a group association rule of these several individual public identities, the registration of this group public identity consisting of registering the latter in a location database of a location server associated with the network.

This group public identity is then associated with identification data of the latter as a group common identity in the location database and the group common public identity can be formed by a common part of the several individual public entities of the group.

During the reception of a public identity across the network, the server can then verify whether or not this received identity corresponds to a group identity stored in the location database.

Therefore as illustrated in FIG. 3, the invention moreover allows a SIP network to route a request to initiate incoming calls containing a partial numbering sequence but complying with one of the rules stored in the SIP network. The advantage is that the entity receiving the request to initiate a call containing an incomplete number is the entity which manages these numbers. This entity can then send an error message to the caller indicating that the number is incomplete (such as for example the "484 address incomplete" message), thus giving an invitation to transmit the number completed by the additional digits which would have been dialled in the meantime by the caller.

The different messages labelled (1) to (11) on FIG. 3 illustrate the different exchanges between the network, the server 12 and the location database 13, IPBX 10 and the corresponding addressee, the latter being denoted by the general reference 16.

Thus it can be seen that the data is routed by the network to the item of equipment for managing group common public identities, the latter using a step of complete analysis of this identity in order to extract from it the corresponding individual public identity and routing this data and therefore this call to a corresponding addressee connected and managed by this item of equipment.

As the various messages exchanged are of a known type, they will not be described in further detail below.

This method and this system can be implemented by computerized means such as a computer program which then comprises code instructions which, when this program is executed, make it possible to define and register a group public identity representing at least one group of several individual public entities in an internet-type information transmission network using a SIP protocol to initiate data transmission links between the network and a group public identity management item of equipment connected to this network.

In fact the method according to the invention relies on the carrier capacity between a "UA" and its SIP "REGISTRAR", a request for registration of a rule defining a group represented by a group common public identity, the ability to store this rule and the associated contact address(es) in a location database and the ability, during receipt of an incoming request, to query the location database storing the rules and to verify if the destination public identity received in the request verifies one of the registered rules.

Of course, other embodiments can also be envisaged.

What is claimed is:

1. A method of managing group public identities for initiating data transmission links between a network using a SIP protocol and a group public management item of equipment connected to this network, comprising:
   a step of defining a group public identity representing at least one group of several individual public entities managed by said group public management item of equipment by defining a rule for associating said several individual public entities in a group;
   a step of registering said group public identity on an identity registration management server, based on a registration request issued from the group public management item of equipment, the registration request comprising a contact address of the group public management item of equipment and the defined rule, the step of registering consisting in storing the defined rule in association with the contact address in the identity registration management server,
   a step of verifying a request to initiate an incoming call, said request containing a numbering sequence, intended to verify if said numbering sequence corresponds to the registered group public identity by verifying if the numbering sequence complies with the defined rule; and
   a step of sending said request to the unique contact address of the group public management item of equipment associated with the registered group public identity.

2. The method according to claim 1, wherein the step of registration of the group public identity comprises the step of registering the group public identity in a location database of said network.

3. Method according to claim 2, wherein said group public identity is associated with identification information of the group public identity as a common group identity in the location database.

4. Method according to claim 1, wherein the group public identity is formed by a common part of the several individual public entities of the group.

5. Method according to claim 1, wherein said contact address corresponding to that of said group public management item of equipment, said method comprises, following the receipt of said request to initiate an incoming call by said group public management item of equipment:
   a step of analysis by said group public management item of equipment of this group public identity in order to extract from it the corresponding individual public identity;
   a step of routing said request to a corresponding addressee to the individual public identity extracted and connected to this group public management item of equipment, if said numbering sequence is complete; and
   a step of sending a message to said network indicating that the numbering sequence is incomplete, if said numbering sequence is partial.

6. A non-transitory computer readable storage medium with an executable program stored thereon, wherein the program includes instructions for implementing the method according to claim 5.

7. A non-transitory computer readable storage medium with an executable program stored thereon, wherein the program includes instructions for implementing the method according to claim 1.

8. A group public management item of equipment for managing a group public identity in an internet-type information transmission network using a SIP protocol to initiate data transmission links between said group public management item of equipment and said internet-type information transmission network, comprising:
   means for defining a group public identity representing at least one group of several individual public entities managed by said group public management item of equipment by defining a rule for associating said several individual public entities in a group;
   means for sending a registration request of the group public identity to register the group public identity in a location database linked to a server for managing public identity records associated with said internet-type information transmission network, said registration request comprising the defined rule and a contact address of the group public management item of equipment to be associated with the defined rule in the identity registration management server;
   means for analyzing a request to initiate an incoming call, said request containing a group public identity registered in said location database, for extracting the corresponding individual public identity;
   the item of equipment being able to implement:
   means for routing said request to an addressee corresponding to the individual public identity extracted, and connected to said group public management item of equipment, if said numbering sequence of the request is complete; and
   means for sending a message to said internet-type information transmission network indicating that the numbering sequence is incomplete, if said numbering sequence is partial.

9. A server for managing public identity registrations for an internet-type information transmission network using a SIP protocol for initiating data transmission links between said internet-type information transmission network using a SIP protocol and a group public identity management item of equipment connected to this internet-type information transmission network, said server being linked to a registration location database, the server comprising:
   means for receiving a registration request of a group public identity representing at least one group of several individual public entities managed by said group public management item of equipment, the group public identity being defined by a rule comprised in the registration request, the registration request further comprising a contact address of the group public management item of equipment;
   means for registering said group public identity by storing the rule in association with the contact address in the identity registration management server;
   means for verifying a request to initiate an incoming call, said request containing a numbering sequence, suitable for verifying if said numbering sequence corresponds to said registered group public identity in the location database by verifying that the numbering sequence complies with the rule; and
   means for sending said request to the contact address of the group public management item of equipment associated with the registered group public identity.

* * * * *